(12) United States Patent
Zhang

(10) Patent No.: US 9,440,745 B1
(45) Date of Patent: Sep. 13, 2016

(54) AIR DISTRIBUTION SYSTEM FOR SMALL COMMERCIAL AIRPLANE

(71) Applicant: The Boeing Company, Chicago, IL (US)

(72) Inventor: Wei Zhang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 595 days.

(21) Appl. No.: 13/940,778

(22) Filed: Jul. 12, 2013

(51) Int. Cl.
*B64D 13/00* (2006.01)
*B64D 13/02* (2006.01)

(52) U.S. Cl.
CPC ..................... *B64D 13/02* (2013.01)

(58) Field of Classification Search
CPC .... A47J 31/401; A47J 31/41; B67D 1/0044; B67D 1/0046; B67D 1/0079; B67D 1/1275; B67D 2001/0811; B01D 45/16; B04C 2009/002; B04C 2009/005; B04C 3/00; B04C 3/06; B04C 5/081; B04C 5/185
USPC .......... 222/133, 145.5, 214; 99/279; 55/434, 55/459.1; 366/165.1
See application file for complete search history.

(56) References Cited

U.S. PATENT DOCUMENTS

| | | | | |
|---|---|---|---|---|
| 2008/0099606 A1* | 5/2008 | Horstman | ............... | B64D 13/06 244/118.5 |
| 2009/0071556 A1* | 3/2009 | Bourlart | ................... | B01F 3/02 137/597 |
| 2009/0073799 A1* | 3/2009 | Bourlart | ................... | B01F 3/02 366/107 |
| 2009/0158932 A1* | 6/2009 | Arnold | .................. | A47L 9/1608 95/271 |
| 2010/0240290 A1* | 9/2010 | Markwart | .............. | B64D 13/00 454/71 |
| 2012/0118528 A1* | 5/2012 | Al-Ali | ................... | B64D 13/08 165/41 |

* cited by examiner

*Primary Examiner* — Steven B McAllister
*Assistant Examiner* — Reginald McNeill, II
(74) *Attorney, Agent, or Firm* — Joseph M. Rolnicki; Evans & Dixon, L.L.C.

(57) ABSTRACT

An air distribution system for an aircraft that has a simplified construction that saves space in the aircraft, reduces the weight of the air distribution system from that of currently employed air distribution systems, handles the mixing of interior aircraft cabin air with exterior fresh air and the drainage of moisture from the air, and improves aircraft cabin air quality. The system employs a mixing chamber having a conical configuration with an apex of the conical configuration at the bottom of the chamber and a base of the conical configuration at the top of the chamber. Inside the chamber first and second separate interior volumes separated by an interior wall of the mixing chamber wrap around each other. The interior air and exterior air are mixed as they spiral around the interior volumes and are directed toward two discharge openings from the two volumes at the top of the mixing chamber. From the discharge openings the mixed air is directed to air diffusers in the aircraft cabin. Moisture removed from the air in the mixing chamber drains downwardly through the two interior volumes to a drain opening at the bottom of the mixing chamber.

28 Claims, 6 Drawing Sheets

AIR DISTRIBUTION SYSTEM FOR SMALL COMMERCIAL AIRPLANE

FIELD

The present invention pertains to an air distribution system for a small commercial airplane. In particular, the present invention pertains to an air distribution system for an aircraft having a simplified construction that saves space in the aircraft, reduces the weight of the air distribution system from that of currently employed air distribution systems, handles the mixing of interior aircraft cabin air with exterior fresh air and the drainage of moisture from the air, and improves aircraft cabin air quality. The system employs a novel mixing chamber having a conical configuration with an apex of the conical configuration at the bottom of the chamber and a base of the conical configuration at the top of the chamber. Inside the chamber first and second separate interior volumes spiral or wrap around each other. A controller communicates with each of the interior volumes and controls a percentage ratio of interior air taken from the aircraft cabin and exterior air taken from outside the aircraft that is supplied to each of the interior volumes. The interior air and exterior air are mixed as they spiral around the interior volumes and are directed toward two discharge openings for each volume at the top of the mixing chamber. From the discharge openings the mixed air is directed to discharge nozzles in the aircraft cabin. Moisture removed from the air drains downwardly through the two interior volumes to a drain opening at the bottom of the mixing chamber.

BACKGROUND

Commercial aircraft set up for the transportation of passengers typically include rows of seats along the length of the aircraft cabin. Because the primary purpose of this type of commercial aircraft is to transport passengers, the aircraft cabin is usually set up to maximize the number of seats in the cabin. However, increasing the number of seated passengers in the aircraft cabin also increases the need for the volume of air in the aircraft to be refreshed, filtered and returned to the aircraft at a flow rate that is sufficient to keep the passengers comfortable.

Environmental control systems or air distribution systems have been developed for aircraft that continuously remove stale air from the aircraft cabin interior, pass the air through filters to sanitize the air, mix the air from the interior of the aircraft cabin with fresh air from the exterior of the aircraft and then return the refreshed air to the aircraft cabin interior. An example of such a prior art air distribution system is represented in FIG. 1. FIG. 1 is a representation of a cross-section of an aircraft with a prior art air distribution system. The aircraft 10 has an outer fuselage wall 12 that extends around the aircraft exterior and encloses the aircraft interior 14. A floor surface 16 extends across the interior 14 of the aircraft. Opposite left 18 and right 22 sidewalls extend upwardly from opposite sides of the floor surface 16 along the interior of the fuselage wall 12 and meet at the top of the aircraft interior 14. Left 24 and right 26 baggage compartments are formed in the respective left 18 and right 22 sidewalls near the top of the aircraft interior 14. Left 28 and right 32 rows of seats are positioned adjacent the respective left 18 and right 22 sidewalls and are spacially arranged along the length of the aircraft interior 14. A space is left between the rows of seats 28, 32 and forms a center aisle 34 of the aircraft.

There are cavities 36, 38 or spaces between the left 18 and right 22 sidewalls and the fuselage wall 12. The cavities 36, 38 accommodate or form portions of airflow conduits or channels that extend upwardly along the opposite sides of the aircraft interior 14. There are similar cavities 42, 44 or spaces below the opposite sides of the floor surface 16. These cavities 42, 44 also accommodate or form air flow conduits or channels extending from the respective sidewalls 18, 22 toward the center aisle 34.

The left 36 and right 38 cavities deliver a flow of air to a pair of respective left 46 and right 48 air diffusers that deliver a flow of air to an upper, center area of the cabin interior 14. These diffusers 46, 48 can be in the form of nozzles or other equivalent devices and are positioned just below the respective left 24 and right 26 baggage compartments. The cavities 36, 38 also deliver a flow of air to respective left 52 and right 54 air diffusers that deliver a flow of air to upper, outer areas of the aircraft interior 14. These diffusers can also be in the form of nozzles or other equivalent devices and are positioned at approximately head height of passengers seated in the seats 28, 32. The left 36 and right 38 cavities also deliver a flow of air to respective left 56 and right 58 air diffusers that are positioned to deliver a flow of air to lower, outer areas of the aircraft interior 14. These diffusers 56, 58 are positioned just above the floor surface 16 of the aircraft. The left 42 and right 44 cavities under the floor surface 16 deliver a flow of air to respective left 62 and right 64 diffusers that are positioned to deliver a flow of air to a lower, center area of the aircraft interior 14. These diffusers 62, 64 can also be nozzles or other equivalent devices. The diffusers 62, 64 are positioned to deliver the flow of air to an area of the aircraft interior 14 near the floor surface 16 of the aircraft and the center aisle 34.

The diffusers are each supplied with a flow of air from a pair of mixing boxes 66, 68 positioned below the floor surface 16 on the left side of the aircraft, and a pair of mixing boxes 72, 74 positioned below the floor surface 16 on a right side of the aircraft. Each of the mixing boxes 66, 68, 72, 74 receives a supply of interior air from the aircraft interior 14 that is typically drawn from the aircraft interior 14 through air returns 76 positioned at the top of the aircraft interior. The interior air is drawn through the air return 76 by fans or other equivalent devices of the aircraft air distribution system and is supplied to each of the mixing boxes 66, 68, 72, 74. The aircraft air distribution system also includes fans or other equivalent devices that draw fresh air or exterior air taken from the aircraft exterior and supply the exterior air to each of the mixing boxes 66, 68, 72, 74. In the mixing boxes 66, 68, 72, 74 the interior air and exterior air are mixed. The proportion of interior air and exterior air mixed in each of the mixing boxes 66, 68, 72, 74 is typically 50/50.

On the left side of the aircraft as shown in FIG. 1, the mixed air from one of the mixing boxes 68 is then supplied to the left air diffusers 46 positioned to the left of the upper, center area of the aircraft interior 14, and to the left air diffusers 52 positioned to the left of the upper, outer area of the aircraft interior 14. The mixed air is also supplied from the other left mixing box 66 to the left air diffusers 56 positioned to the left of the lower, outer area of the aircraft interior 14, and to the left air diffusers 62 positioned to the left of the lower, center area of the aircraft interior 14.

On the right side of the aircraft, mixed air is supplied from one of the right side mixing boxes 74 to the right air diffusers 48 positioned to the right of the upper, center area of the aircraft interior 14, and the right air diffusers 54 positioned to the right of the upper, outer area of the aircraft interior. The other of the right mixing boxes 74 delivers a supply of air to the right air diffuser 58 positioned to the right of the lower, outer area of the aircraft interior 14, and to the right diffuser 64 positioned to the right of the lower, center area of the aircraft interior.

The above described air distribution system works well, however it has a complex construction that requires a substantial amount of space in the aircraft interior. Additionally, the number of mixing boxes and the conduits communicating to and from the mixing boxes add weight to the aircraft which reduces the efficiency of the aircraft.

What is needed is a simplified air distribution system that does not have a complex construction such as that shown in FIG. 1, saves space in the aircraft interior, reduces the weight of the aircraft and handles the mixing of interior air and exterior air while also providing a drain for draining moisture condensation from the mixed air.

SUMMARY

The air distribution system of the present invention overcomes disadvantages associated with prior art air distribution systems discussed above. The air distribution system is basically comprised of a single mixing chamber that replaces the four mixing boxes of the prior art.

The mixing chamber has a general conical configuration with a base of the conical configuration toward the top of the chamber and an apex of the conical configuration toward a bottom of a chamber. The interior of the mixing chamber is divided into two separate volumes by an interior wall having a spiral configuration. The two interior volumes are formed as helixes that spiral around the mixing chamber from the exterior of the chamber toward the center of the chamber. First and second discharge openings are provided on the exterior of the chamber. The first and second discharge openings communicate respectively with the first and second interior volumes. The first discharge opening is operatively connected in air flow communication with a first set of air diffusers in the aircraft interior, and the second discharge opening is operatively connected in air flow communication with a second set of air diffusers in the aircraft interior. A drain opening is provided at the bottom, apex of the chamber for draining moisture that condenses from the mixed air in the first and second interior volumes.

First and second recirculation or interior air inlet openings are provided on the chamber and communicate with the respective first and second interior volumes. The recirculation or interior air inlet openings are also communicated with a supply of interior air taken from the aircraft cabin interior.

First and second fresh air inlet openings are provided on the mixing chamber and communicate with the respective first and second interior volumes. The fresh air inlet openings are communicated with a supply of exterior air taken from the outside of the aircraft.

An interior air valve is connected in fluid communication with the supply of interior air and the first and second recirculation air inlet openings of the mixing chamber.

An exterior air valve is connected in fluid communication with the supply of exterior air and the first and second fresh air inlet openings of the mixing chamber.

A controller is operatively connected to the interior air valve and the exterior air valve and is thereby operatively connected with the mixing chamber. The controller is operable to adjust the interior air valve and exterior air valve to control the supply of interior air to the first and second interior volumes of the mixing chamber and control the supply of exterior air to the first and second interior volumes of the mixing chamber. In this way the controller is operable to control a first percentage mixture of interior air and exterior air supplied to the first interior volume of the mixing chamber and control a second percentage mixture of interior air and exterior air supplied to the second interior volume of the mixing chamber. The first and second percentage mixtures of interior air and exterior air are selectively controlled by the controller in response to conditions in the aircraft cabin. By selective operation of the controller, the first percentage mixture of interior air and exterior air mixed in the first interior volume of the chamber can be adjusted before being supplied to the first set of diffusers and directed into the aircraft cabin, and the second percentage mixture of interior air and exterior air can be adjusted before being mixed in the second interior volume and supplied to the second set of diffusers and directed into the aircraft cabin. Thus, in response to conditions in the aircraft cabin interior, the percentage of interior air and exterior air delivered to an upper area of the aircraft cabin by the first set of diffusers can be adjusted and the percentage of the interior air and exterior air delivered to a lower area of the aircraft cabin by the second set of diffusers can be adjusted.

The features, functions and advantages that have been discussed can be achieved independently in various embodiments or may be combined in yet other embodiments further details of which can be seen with reference to the following description and drawings.

DETAILED DESCRIPTION

Figure 1:
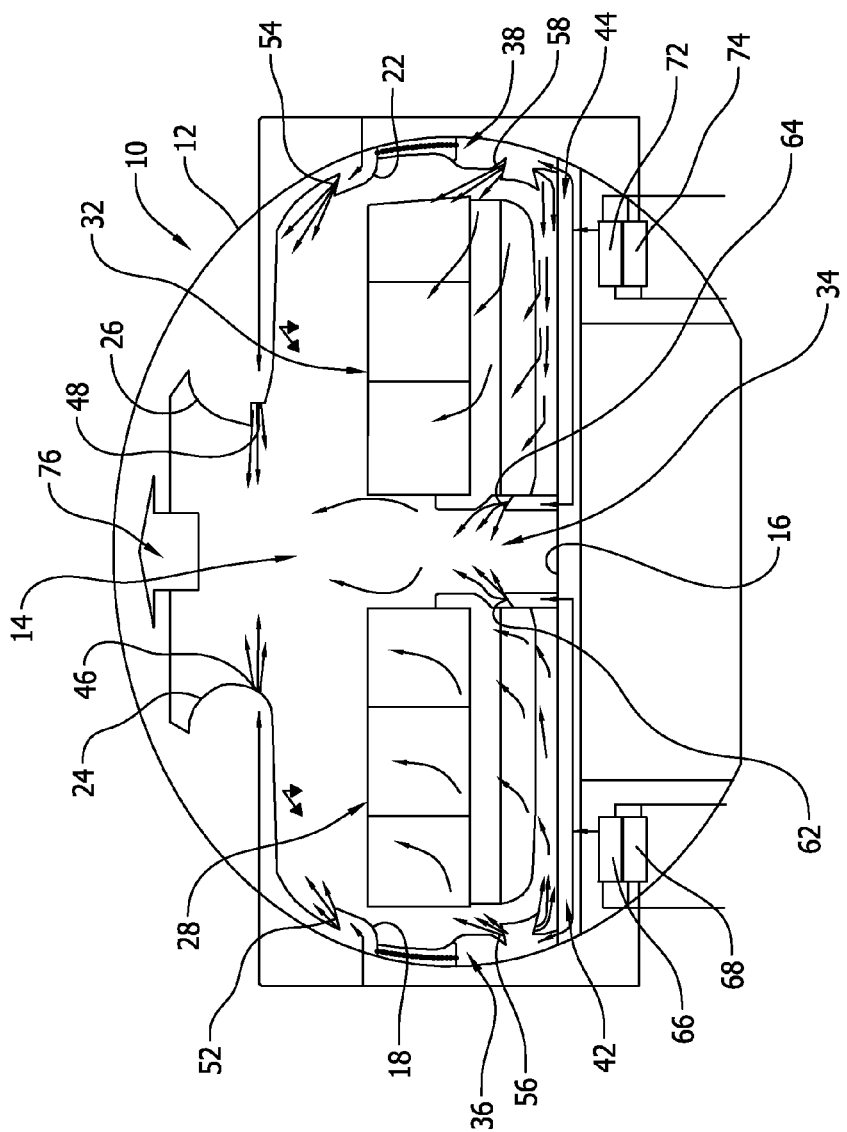
FIG. 1 is a representation of a cross-section of an aircraft cabin employing a prior art air distribution system.
Figure 2:
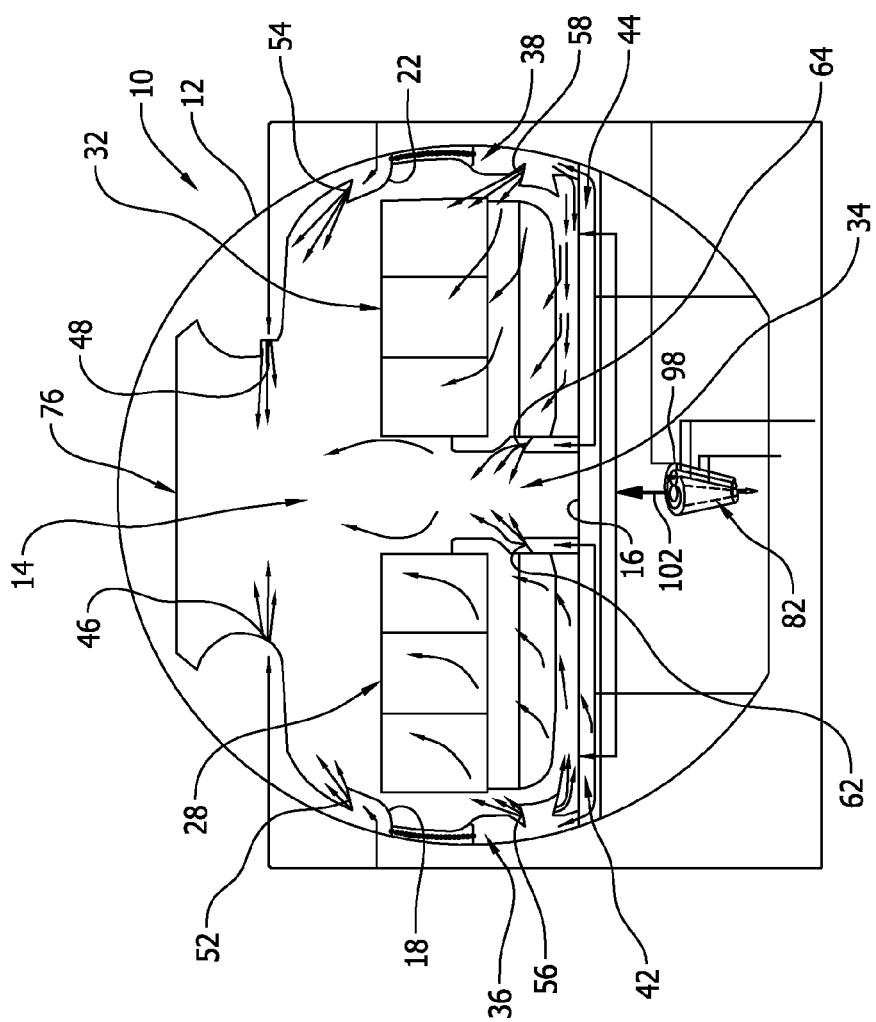
FIG. 2 is a representation of a cross-section of an aircraft interior employing the air distribution system of the invention.

The air distribution system of the invention is basically comprised of a single mixing chamber 82 that replaces the four mixing boxes of the prior art described earlier. This is represented in FIG. 2 which shows the single mixing chamber 82 as part of the air distribution system described earlier and shown in FIG. 1. The air distribution system of FIG. 2 is basically the same as that of FIG. 1, with the mixing boxes 66, 68, 72, 74 removed and replaced by the mixing chamber 82. The other component parts of the air distribution system shown in FIG. 2 that are the same as those of FIG. 1 are labeled with the same reference numbers employed in describing the component parts of FIG. 1. Because the component parts have previously been described with reference to FIG. 1, they will not be described in detail again in the following description of the mixing chamber 82 of the invention shown in FIG. 2.

Referring to FIGS. 3-6, a representation of the exterior housing of the mixing chamber 82 is shown. The housing of mixing chamber 82 has an exterior wall 84 that spirals around a center axis 86 of the chamber. The exterior wall 84 has a general conical configuration around a majority of the wall surface. A portion of the exterior wall 88 gradually extends axially upwardly from the rest of the exterior wall 84 as it spirals clockwise around the center axis as viewed in FIG. 3. This portion of the exterior wall 88 forms an inlet to the mixing chamber 82. The inlet of the mixing chamber is further defined by an annular top wall portion 92 that extends radially inwardly a short distance from the top of the exterior wall portion 88. The annular top wall portion gradually slopes axially downwardly as viewed in FIG. 3 as it extends counterclockwise around the top edge of the exterior wall 84 until it again meets the exterior wall portion 88 and forms a bottom annular wall 94 of the inlet opening. The housing of the mixing chamber 82 also includes a circular top wall 96 that together with the annular wall 92 form the base of the conical configuration of the mixing chamber. The annular top wall portion 92 projects radially outwardly from the circular top wall 96 and then gradually moves axially downwardly from the circular top wall as it spirals counterclockwise around the axis 86 as viewed in FIG. 3. A first discharge opening having a first discharge tube 98 projects radially outwardly from the exterior wall 84. The first discharge opening and the first discharge tube 98 have a rectangular cross section. A second discharge opening having a second discharge tube 102 projects upwardly from the circular top wall 96. The first 98 and second 102 discharge opening tubes communicate with two separate interior volumes of the mixing chamber 82 that are yet to be described.

Referring to FIG. 2, the first discharge opening tube 98 is schematically shown in fluid flow communication with the left 46 and right 48 air diffusers that direct a flow of air to the upper, center area of the aircraft cabin interior 14 and in fluid flow communication with the left 52 and right 54 air diffusers that direct the flow of air to the upper outer areas on the respective left and right sides of the aircraft cabin interior 14. The second discharge opening tube 102 is connected in airflow communication with the left 56 and right 58 air diffusers that direct a flow of air to the lower, outer areas on the respective left and right sides of the aircraft cabin interior 14 and the left 62 and right 64 air diffusers that direct a flow of air to the lower, center areas on the respective left and right sides of the aircraft cabin interior and the respective left and right sides of the center aisle 34.

Figure 6:
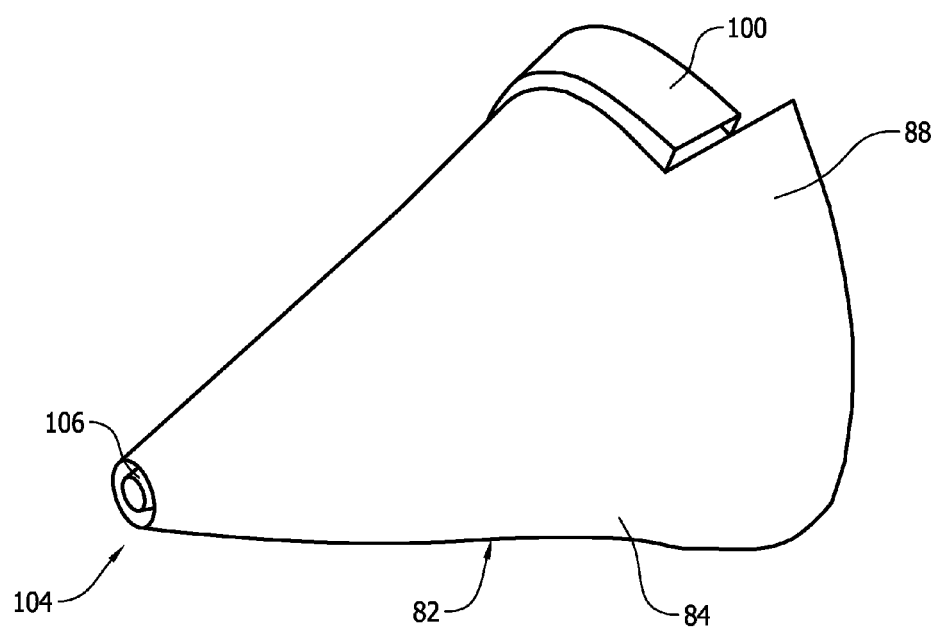
FIG. 6 is a representation of the bottom of the mixing chamber housing exterior.

Referring to FIG. 6, the bottom of the housing of the mixing chamber 82 is shown. The bottom of the mixing chamber housing has a drain opening 104 positioned at the bottom or at the apex of the conical configuration of the housing exterior wall 84. The drain opening 104 allows condensed moisture to drain from both of the two interior volumes of the mixing chamber to be described.

Figure 4:
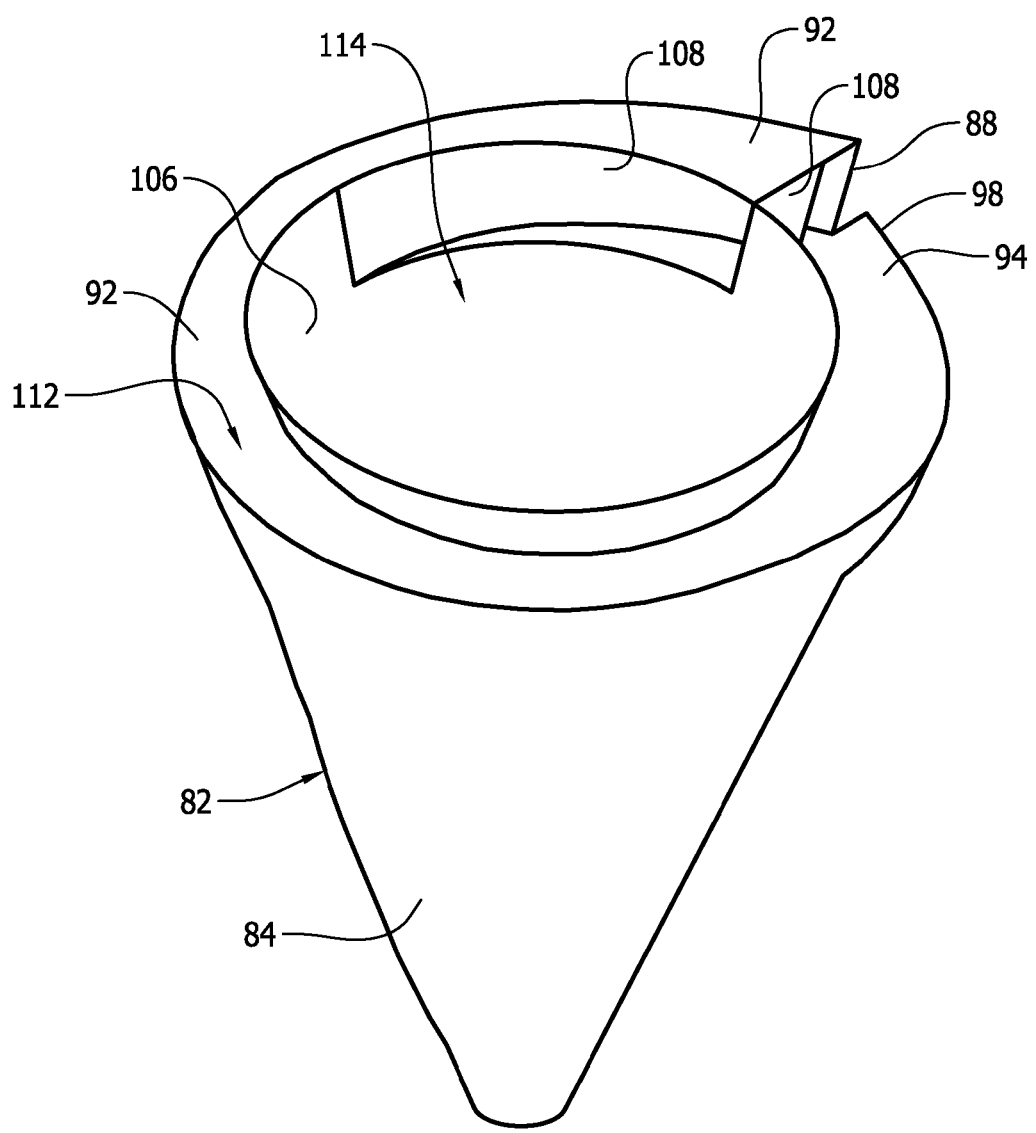
FIG. 4 is a representation of the top of the mixing chamber housing exterior with a top circular wall of the housing removed showing one of two separate interior volumes inside the mixing chamber.
Figure 5:
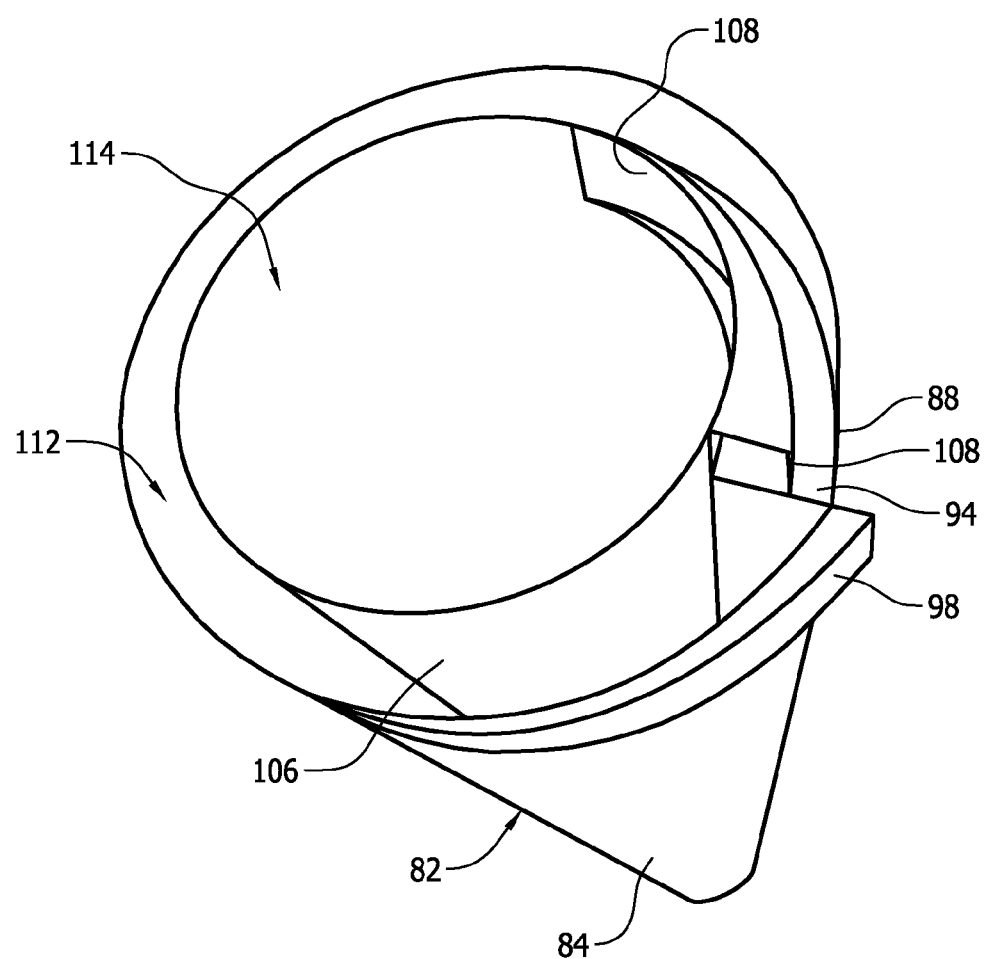
FIG. 5 is a representation of the top of the mixing chamber housing exterior with the top circular wall of the housing removed and a top annular wall of the housing removed showing the two separate interior volumes inside the mixing chamber.

Referring to FIGS. 4-6, an interior wall 106 inside the mixing chamber 82 divides the interior of the mixing chamber into first and second separate interior volumes. The interior wall 106 has a conical configuration that is slightly smaller than that of the exterior wall 84. The interior wall 106 is secured to a radially inner edge of the annular top wall 92 which suspends the interior wall 106 inside the exterior wall 84 with there being a radial space between the two walls that defines the first interior volume of the mixing chamber. The second interior volume is within the interior wall 106. The interior wall 106 has an arcuate inlet wall portion 108 that begins in the inlet of the mixing chamber housing and is positioned radially inwardly from the exterior wall 84 of the housing and the inlet exterior wall portion 88. As the interior wall portion 108 extends into the housing it spirals around the mixing chamber center axis 86 and gradually approaches the center axis until it merges with the interior wall 106 as seen in FIGS. 4 and 5. Thus, the interior wall 106 has a spiral, conical configuration similar to that of the exterior wall 84 of the mixing chamber housing. The spiraling interior wall 106 divides the interior of the mixing chamber 82 into separate spiral shaped first 112 and second 114 interior volumes. The first interior volume 112 communicates with the first discharge opening tube 98 at the upper, outer periphery of the first volume, and communicates with the drain opening 104 at the bottom of the first volume. The second interior volume 114 communicates with the second discharge opening tube 102 at the top, center of the second volume, and communicates with the drain opening 104 at the bottom of the second volume.

Figure 3:
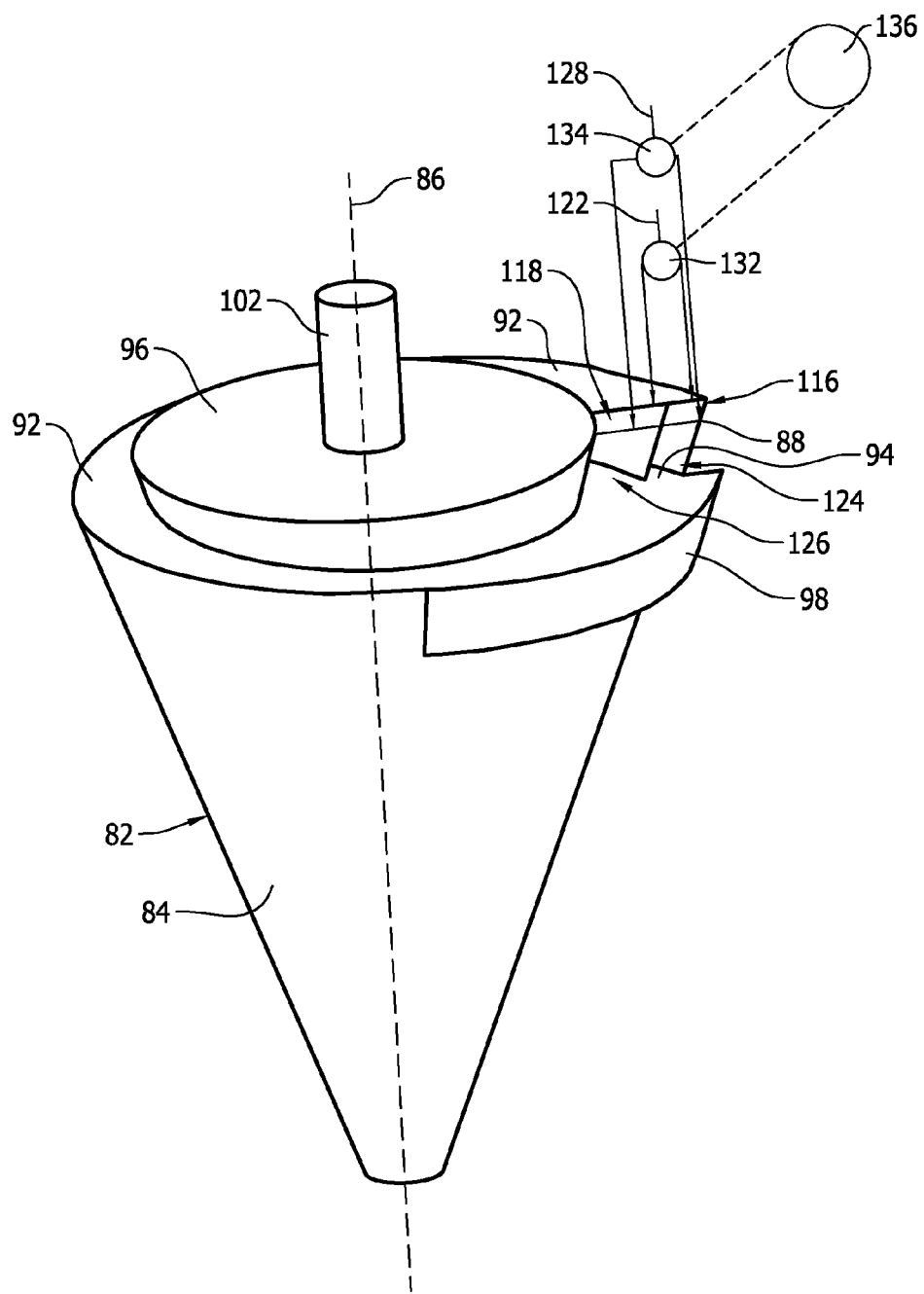
FIG. 3 is a representation of a perspective view of the exterior of the mixing chamber of the air distribution system of the invention.

Referring in FIG. 3, the inlet opening of the mixing chamber 82 is represented as being divided into four separate inlet openings. First 116 and second 118 recirculation air or interior air inlet openings are provided on the mixing chamber 82. The first interior air opening 116 communicates with the first interior volume 112 of the mixing chamber and the second interior air opening 118 communicates with the second interior volume 114 of the mixing chamber. The first 116 and second 118 interior air inlet openings also communicate with a supply of interior air 122 taken from the aircraft cabin interior 14.

First 124 and second 126 fresh air or exterior air inlet openings are provided on the mixing chamber 82. The first exterior air inlet opening 124 communicates with the first interior volume 112 of the mixing chamber and the second exterior air inlet opening 126 communicates with the second interior volume 114 of the mixing chamber. The first 124 and second 126 exterior air inlet openings also communicate with a supply of exterior air 128 taken from the outside of the aircraft.

Interior air from the aircraft cabin interior 14 is supplied to the mixing chamber first interior volume 112 through the first interior air inlet opening 116 and exterior air from the aircraft exterior that is supplied to the mixing chamber first interior volume 112 through the first exterior air inlet opening 124. The interior air and exterior air is mixed in the first interior volume 112 as the air spirals around the interior volume. The conical configuration of the mixing chamber 82 directs the mixing air upwardly to the first discharge opening tube 98 where the mixed air is discharged from the mixing chamber 82. As the air is mixed in the first interior volume 112 moisture in the air condenses on the interior surface of the mixing chamber 82 exterior wall 84. The condensed moisture runs down the interior surface of the mixing chamber 82 to the drain opening 104 where it drains from the mixing chamber. In this way, the first interior volume 112 reduces the humidity of the air mixed in the volume on typical ground condition.

In substantially the same manner, interior air supplied from the aircraft cabin interior 14 to the second interior volume 114 through the second interior air inlet opening 118 and exterior air from the exterior of the aircraft supplied to the second interior volume 114 through the second exterior air inlet opening 126 is mixed in the second interior volume 114 as it spirals around the interior volume. The conical configuration of the mixing chamber 82 directs the mixing air upwardly through the second interior volume 114 to the second discharge opening tube 102 where the mixed air is discharged from the mixing chamber 82. Moisture in the mixing air condenses on the interior surface of the mixing chamber 82 interior wall 106. The condensed moisture runs down the interior surface of the mixing chamber 82 to the drain opening 104 where the moisture is drained from the mixing chamber. In this way, the second interior volume 114 reduces the humidity of the air mixed in the volume on typical ground condition.

FIG. 3 also shows a schematic representation of the system of controlling the supply of air to the mixing chamber 82.

An interior air valve 132 is connected in fluid communication with the supply of interior air 122 and the first 116 and second 118 interior air inlet openings of the mixing chamber 82.

An exterior air valve 134 is connected in fluid communication with the supply of exterior air 128 and the first 124 and second 126 fresh air inlet openings of the mixing chamber 82.

A controller 136 is operatively connected to the interior air valve 132 and the exterior air valve 134. The controller 136 is thereby operatively connected with the mixing chamber 82. The controller 136 is operable to adjust the interior air valve 132 and the exterior air valve 134 to control the supply of interior air to the first 112 and second 114 interior volumes of the mixing chamber 82, and control the supply of exterior air to the first 112 and second 114 interior volumes of the mixing chamber. In this way, the controller 136 is operable to control a first percentage mixture of interior air and exterior air supplied to the first interior volume 112 of the mixing chamber 82, and control a second percentage mixture of the interior air and exterior air supplied to the second interior volume 114 of the mixing chamber. The first and second percentage mixtures of interior air and exterior air are selectively controlled by the controller 136 in response to conditions in the aircraft cabin interior 14. By selective operation of the controller 136, the first percentage mixture of interior air and exterior air mixed in the first interior volume 112 of the mixing chamber 82 can be adjusted before being mixed in the first volume 112, discharged through the first discharge tube 98, supplied to the first set of diffusers 46, 48, 52, 54 and directed into the aircraft cabin interior 14, and the second percentage mixture of interior air and exterior air can be adjusted before being mixed in the second interior volume 114, discharged through the second discharge tube 102, supplied to the second set of diffusers 56, 58, 62, 64 and directed into the aircraft cabin interior 14. Thus, in response to conditions in the aircraft cabin interior 14, the percentage of interior air and exterior air delivered to an upper area of the aircraft by the first set of diffusers 46, 48, 52, 54 can be adjusted and the percentage of interior air and exterior air delivered to a lower area of the aircraft by the second set of diffusers 56, 58, 62, 64 can be adjusted.

As various modifications could be made in the construction of the air distribution system of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An aircraft comprising:
an aircraft cabin having seating for passengers;
a first set of diffusers in the aircraft cabin;
a second set of diffusers in the aircraft cabin;
a supply of interior air taken from the aircraft cabin;
a supply of exterior air taken from outside the aircraft cabin;
a mixing chamber, mixing chamber having an exterior wall with a conical configuration that spirals around a center axis of the mixing chamber and gives the mixing chamber a conical configuration with an apex of the conical configuration at a bottom of the mixing chamber and a base of a conical configuration at a top of the mixing chamber, the mixing chamber having a first interior volume and a second interior volume, the first and second interior volumes being separate, the mixing chamber having an interior wall inside the exterior wall of the mixing chamber, the interior wall having a conical configuration that spirals around the center axis of the mixing chamber, the interior wall separating the first interior volume and the second interior volume, the mixing chamber having a moisture drain opening at the apex of the conical configuration of the mixing chamber, the mixing chamber having a first discharge opening at the base of the conical configuration of the mixing chamber and the mixing chamber having a second discharge opening at the base of the conical configuration of the mixing chamber;
the first interior volume communicating with the first set of diffusers, the supply of interior air and the supply of exterior air;
the second interior volume communicating with the second set of diffusers, the supply of interior air and the supply of exterior air; and,
a controller operatively connected with the mixing chamber, the controller being operable to control the supply of interior air to the first and second interior volumes and control the supply of exterior air to the first and second interior volumes and thereby control a first percentage mixture of interior air and exterior air supplied to the first interior volume and discharged through the first set of diffusers into the aircraft cabin and control a second percentage mixture of interior air and exterior air supplied to the second interior volume and discharged through the second set of diffusers into the aircraft cabin.

2. The aircraft of claim 1, further comprising:
the mixing chamber first and second discharge openings communicating with the respective first and second sets of diffusers at the base of the conical configuration.

3. The aircraft of claim 1, further comprising:
the first interior volume having a spiral configuration; and,
the second interior volume having a spiral configuration.

4. The aircraft of claim 1, further comprising:
the mixing chamber having a first recirculation inlet opening communicating the supply of interior air with the first interior volume, a first fresh air inlet opening communicating the supply of exterior air with the first interior volume, a second recirculation inlet opening communicating the supply of interior air with the second interior volume and a second fresh air inlet opening communicating the supply of exterior air with the second interior volume.

5. The aircraft of claim 4, further comprising:
the mixing chamber first discharge opening communicating with the first interior volume, the first recirculation inlet opening and the first fresh air inlet opening; and,
the mixing chamber second discharge opening communicating with the second interior volume, the second recirculation inlet opening and the second fresh air inlet opening.

6. The aircraft of claim 1, further comprising:
an interior air valve connected in fluid communication between the supply of interior air and the first and second interior volumes of the mixing chamber;
an exterior air valve connected in fluid communication between the supply of exterior air and the first and second interior volumes of the mixing chamber; and,
the controller being operatively connected to the interior air valve and the exterior air valve to control the first percentage mixture of interior air and exterior air supplied to the first interior volume and control the second percentage mixture of interior air and exterior air supplied to the second interior volume.

7. The aircraft of claim 1, further comprising:
the first percentage mixture of interior air and exterior air being different from the second percentage mixture of interior air and exterior air.

8. The aircraft of claim 1, further comprising:
the first and second percentage mixtures of interior air and exterior air being selectively controlled by the controller in response to conditions in the aircraft cabin.

9. The aircraft of claim 5, further comprising:
the first discharge opening communicating with the first set of diffusers in a first area of the aircraft cabin; and,
the second discharge opening communicating with the second set of diffusers in a second area of the aircraft cabin, the first set of diffusers in the first area of the aircraft cabin being above the second set of diffusers in the second area of the aircraft cabin.

10. The aircraft of claim 1, further comprising:
the first percentage mixture of interior air and exterior air having more exterior air than the second percentage mixture of interior air and exterior air.

11. The aircraft of claim 1, further comprising:
the controller being operable to control a first air flow rate of air discharged from the first interior volume and to control a second airflow rate of air discharged from the second interior volume.

12. The aircraft of claim 11, further comprising:
the first airflow rate being different from the second airflow rate.

13. The aircraft of claim 12, further comprising:
the first and second airflow rates being selectively controlled by the controller in response to conditions in the aircraft cabin.

14. The aircraft of claim 9, further comprising:
the first inlet opening, the first interior volume, the first discharge opening and the first set of diffusers forming a first ventilation circuit of the aircraft; and,
the second inlet opening, the second interior volume, the second discharge opening and the second set of diffusers forming a second ventilation circuit of the aircraft.

15. An aircraft comprising:
an aircraft cabin having seating for passengers;
a first set of diffusers in the aircraft cabin;
a second set of diffusers in the aircraft cabin;
a mixing chamber, the mixing chamber having an exterior wall with a conical configuration that spirals around a center axis of the mixing chamber and gives the mixing chamber a conical configuration with an apex of the conical configuration at bottom of the mixing chamber and a base of a conical configuration at a top of the mixing chamber, the mixing chamber having a first interior volume and a second interior volume, the first and second interior volumes being separate, the mixing chamber having an interior wall inside the exterior wall of the mixing chamber, the interior wall having a conical configuration that spirals around the center axis of the mixing chamber, the interior wall separating the first interior volume and the second interior volume, the mixing chamber having a moisture drain opening at the apex of the conical configuration of the mixing chamber, the mixing chamber having a first discharge opening at the base of the conical configuration of the mixing, chamber and the mixing chamber having a second discharge opening at the base of the conical configuration of the mixing chamber, the first interior volume communicating with the first set of diffusers through the first discharge opening and the second interior volume communicating with the second set of diffusers through the second discharge opening;
a supply of interior air taken from the aircraft cabin and communicating with the first and second interior volumes;
a supply of exterior air taken from outside the aircraft and communicating with the first and second interior volumes; and,
a controller operatively connected with the mixing chamber, the controller being operable to control a first percentage mixture of interior and exterior air discharged through the first set of diffusers from the first interior volume of the mixing chamber and to control a second percentage mixture of interior air and exterior air discharged through the second set of diffusers from the second interior volume of the mixing chamber.

16. The aircraft of claim 15, further comprising:
the first interior volume having a spiral configuration; and,
the second interior volume having a spiral configuration.

17. The aircraft of claim 15, further comprising:
the mixing chamber having a first recirculation inlet opening communicating the supply of interior air with the first interior volume, a first fresh air inlet opening communicating the supply of exterior air with the first interior volume, a second recirculation inlet opening communicating the supply of interior air with the second interior volume and a second fresh air inlet opening communicating the supply of exterior air with the second interior volume.

18. The aircraft of claim 17, further comprising:
the mixing chamber first discharge opening communicating with the first interior volume, the first recirculation inlet opening and the first fresh air inlet opening; and,
the mixing chamber having a second discharge opening communicating with the second interior volume, the second recirculation inlet opening and the second fresh air inlet opening.

19. The aircraft of claim 15, further comprising:
the controller being operable to control a first percentage mixture of interior air and exterior air supplied to the first interior volume and control a second percentage mixture of interior air and exterior air supplied to the second interior volume.

20. The aircraft of claim 15, further comprising:
an interior air valve connected in fluid communication between the supply of interior air and the first and second interior volumes of the mixing chamber;
an exterior air valve connected in fluid communication between the supply of exterior air and the first and second interior volumes of the mixing chamber; and,
the controller being operatively connected to the interior air valve and the exterior air valve to control the first percentage mixture of interior air and exterior air supplied to the first interior volume and control the second percentage mixture of interior air and exterior air supplied to the second interior volume.

21. The aircraft of claim 15, further comprising:
the first percentage mixture of interior air and exterior air being different from the second percentage mixture of interior air and exterior air.

22. The aircraft of claim 15, further comprising:
the first and second percentage mixtures of interior air and exterior air being selectively controlled by the controller in response to conditions in the aircraft cabin.

23. The aircraft of claim 18, further comprising:
the first discharge opening communicating with the first set of diffusers in a first area of the aircraft cabin; and,
the second discharge opening communicating with the second set of diffusers in a second area of the aircraft cabin, the second set of diffusers in the second area of the aircraft cabin being below the first set of diffusers in the first area of the aircraft cabin.

24. The aircraft of claim 15, further comprising:
the first percentage mixture of interior air and exterior air having more exterior air than the second percentage mixture of interior air and exterior air.

25. The aircraft of claim 15, further comprising:
the controller being operable to control a first air flow rate of air discharged from the first interior volume and to control a second airflow rate of air discharged from the second interior volume.

26. The aircraft of claim 25, further comprising:
the first airflow rate being different from the second airflow rate.

27. The aircraft of claim 26, further comprising:
the first and second airflow rates being selectively controlled by the controller in response to conditions in the aircraft cabin.

28. The aircraft of claim 23, further comprising:
the first inlet opening, the first interior volume, the first discharge opening and the first set of diffusers forming a first ventilation circuit of the aircraft; and,
the second inlet opening, the second interior volume, the second discharge opening and the second set of diffusers forming a second ventilation circuit of the aircraft.

* * * * *